(12) United States Patent
Kumar et al.

(10) Patent No.: US 9,792,224 B2
(45) Date of Patent: Oct. 17, 2017

(54) REDUCING LATENCY BY PERSISTING DATA RELATIONSHIPS IN RELATION TO CORRESPONDING DATA IN PERSISTENT MEMORY

(71) Applicant: Intel Corporation, Santa Clara, CA (US)

(72) Inventors: Karthik Kumar, Chandler, AZ (US); Martin P. Dimitrov, Chandler, AZ (US); Thomas Willhalm, Sandhausen (DE)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 14/921,809

(22) Filed: Oct. 23, 2015

(65) Prior Publication Data
US 2017/0116133 A1    Apr. 27, 2017

(51) Int. Cl.
*G06F 12/08* (2016.01)
*G06F 12/1027* (2016.01)
*G06F 12/0862* (2016.01)

(52) U.S. Cl.
CPC ...... *G06F 12/1027* (2013.01); *G06F 12/0862* (2013.01); *G06F 2212/1024* (2013.01); *G06F 2212/221* (2013.01)

(58) Field of Classification Search
CPC ............. G06F 12/0215; G06F 12/0824; G06F 12/0862; G06F 12/1027; G06F 2212/221; G06F 2212/1024
See application file for complete search history.

(56) References Cited

U.S. PATENT DOCUMENTS

| 5,912,839 | A | 6/1999 | Ovshinsky et al. | |
|---|---|---|---|---|
| 6,304,962 | B1 * | 10/2001 | Nair | G06F 9/3806 711/128 |
| 6,401,193 | B1 * | 6/2002 | Afsar | G06F 9/383 711/E12.057 |
| 6,412,050 | B1 * | 6/2002 | Jourdan | G06F 9/3806 711/133 |
| 6,728,840 | B1 * | 4/2004 | Shatil | G06F 12/0866 707/999.003 |
| 6,988,190 | B1 * | 1/2006 | Park | G06F 9/325 712/241 |
| 7,590,918 | B2 | 9/2009 | Parkinson | |
| 7,600,078 | B1 | 10/2009 | Cen et al. | |

(Continued)

FOREIGN PATENT DOCUMENTS

WO    2014143056 A1    9/2014

OTHER PUBLICATIONS

Giles, et al., "Bridging the Programming Gap between Persistent and Volatile Memory using WrAP," Proceedings of the ACM International Conference on Computing Frontiers, p. 30 (2013).

(Continued)

*Primary Examiner* — Hiep Nguyen
(74) *Attorney, Agent, or Firm* — Lowenstein Sandler LLP

(57) ABSTRACT

A processor or system may include a memory controller to store, in a pre-allocated portion of bit-addressable, random access persistent memory (PM), a relationship between a group of addresses being stored in the PM according to a set of instructions when executed. The memory controller is further to retrieve the relationship when accessing an address from the groups of addresses.

25 Claims, 10 Drawing Sheets

(56) References Cited

U.S. PATENT DOCUMENTS

| | | | |
|---|---|---|---|
| 7,756,053 | B2 | 7/2010 | Thomas et al. |
| 7,913,147 | B2 | 3/2011 | Swaminathan et al. |
| 7,971,112 | B2 | 6/2011 | Murata |
| 8,051,253 | B2 | 11/2011 | Okin et al. |
| 8,225,181 | B2 | 7/2012 | Perlmutter |
| 8,364,867 | B2 | 1/2013 | Karamcheti et al. |
| 8,386,650 | B2 | 2/2013 | Mangold |
| 8,462,537 | B2 | 6/2013 | Karpov et al. |
| 8,462,577 | B2 | 6/2013 | Zeng et al. |
| 8,463,948 | B1 | 6/2013 | Qawami et al. |
| 8,533,550 | B2 | 9/2013 | Khan |
| 8,605,531 | B2 | 12/2013 | Kau et al. |
| 8,607,089 | B2 | 12/2013 | Qawami et al. |
| 8,612,676 | B2 | 12/2013 | Dahlen et al. |
| 8,612,809 | B2 | 12/2013 | Casper et al. |
| 8,649,212 | B2 | 2/2014 | Kau et al. |
| 8,838,935 | B2 | 9/2014 | Hinton |
| 8,924,816 | B2 | 12/2014 | Khan |
| 9,298,606 | B2 | 3/2016 | Ramanujan |
| 9,317,429 | B2 | 4/2016 | Ramanujan et al. |
| 9,342,453 | B2 | 5/2016 | Nale et al. |
| 9,378,133 | B2 | 6/2016 | Nachimuthu et al. |
| 9,430,372 | B2 | 8/2016 | Nachimuthu et al. |
| 2002/0087800 | A1* | 7/2002 | Abdallah ............... G06F 9/383 711/137 |
| 2004/0049639 | A1* | 3/2004 | So ....................... G06F 12/0862 711/137 |
| 2006/0274077 | A1* | 12/2006 | Chung .................. G06T 15/005 345/582 |
| 2007/0005922 | A1 | 1/2007 | Swaninathan et al. |
| 2007/0220228 | A1 | 9/2007 | Huang et al. |
| 2008/0016269 | A1 | 1/2008 | Chow et al. |
| 2008/0034148 | A1 | 2/2008 | Gower |
| 2008/0270811 | A1 | 10/2008 | Chow et al. |
| 2009/0006813 | A1* | 1/2009 | Singhal .................. G06F 9/383 712/207 |
| 2009/0031078 | A1 | 1/2009 | Warnes et al. |
| 2009/0144600 | A1 | 6/2009 | Perlmutter |
| 2009/0199056 | A1 | 8/2009 | Murata |
| 2009/0313416 | A1 | 12/2009 | Nation |
| 2010/0110748 | A1 | 5/2010 | Best |
| 2010/0131827 | A1 | 5/2010 | Sokolov |
| 2010/0262750 | A1* | 10/2010 | Deshpande ......... G06F 12/0862 711/3 |
| 2010/0291867 | A1 | 11/2010 | Abdulla et al. |
| 2010/0293317 | A1 | 11/2010 | Confalonieri et al. |
| 2010/0306446 | A1 | 12/2010 | Villa et al. |
| 2010/0306453 | A1 | 12/2010 | Doller |
| 2010/0318718 | A1 | 12/2010 | Eilert et al. |
| 2011/0153916 | A1 | 6/2011 | Chinnaswamy et al. |
| 2011/0208900 | A1 | 8/2011 | Schuette et al. |
| 2011/0291884 | A1 | 12/2011 | Oh et al. |
| 2012/0254696 | A1 | 10/2012 | Perlmutter |
| 2013/0086311 | A1 | 4/2013 | Huang et al. |
| 2013/0145085 | A1 | 6/2013 | Yu et al. |
| 2013/0268728 | A1 | 10/2013 | Ramanujan et al. |
| 2013/0275661 | A1 | 10/2013 | Zimmer et al. |
| 2013/0290597 | A1 | 10/2013 | Faber |
| 2014/0040550 | A1 | 2/2014 | Nale |
| 2014/0129767 | A1 | 5/2014 | Ramanujan et al. |
| 2014/0281240 | A1 | 9/2014 | Willhalm |
| 2014/0297938 | A1 | 10/2014 | Puthiyedath et al. |
| 2015/0243335 | A1 | 8/2015 | Naeimi et al. |
| 2016/0055088 | A1* | 2/2016 | Zhang ................. G06F 12/0862 711/137 |
| 2016/0283354 | A1 | 9/2016 | Lantz et al. |
| 2016/0378607 | A1 | 12/2016 | Kumar et al. |

OTHER PUBLICATIONS

Dimitrov, Martin et al., "Combining Local and Global History for High Performance Data Prefetching," Journal of Instruction-Level Parallelism 13, pp. 1-14 (2011).

Nesbit, Kyle J. et al., "Data Cache Prefetching using a Global History Buffer," Proceedings of the 10th International Symposium on High Performance Computer Architecture (HPCA '04), pp. 96-96 (2004).

Clark Jack, Intel: Non-Volatile Memory Shift Means Chips need an Overhaul, ZDNet, http://www.zdnet.com/article/intelnonvolatilememoryshiftmeanschipsneedanoverhaul/, pp. 1-8 (Sep. 13, 2012).

"Intel Solid-State Drives in Server Storage Applications," White Paper, pp. 1-24 (Feb. 2014).

Halfacree, Gareth, "Intel Pledges 2016 Launch for 3D XPoint-Based Optane," 2pgs, accessed at http://www.bit-tech.net/news/hardware/2015/08/19/intel-optane/1/ on Aug. 27, 2015.

Lawson, Stephen, "Intel, Micron Claim a New Class of Memory between Flash and DRAM," CIO, pp. 1-4, accessed at http://www.cio.com/article/2953753/intel-micron-claim-a-new-class-of-memory-between-f . . . / on Aug. 27, 2015.

Prout, "The Story Behind MemSQL's Skiplist Indexes," MEMSQL Blog, http://blog.memsql.com/the-story-behind-memsqls-skiplist-indexes/, 6 pages, Jan. 20, 2014.

Webopedia, "FPGA", web.archive.org/web/20021001203456/http://www.webopedia.com/term/f/fpga.html, 2 pages, retrieved May 10, 2017, dated Oct. 30, 2001.

Rouse, "Object Code," http://whatis.techtarget.com/definition/object-code, WhatIs.com, TechTarget, 1 page, accessed May 19, 2017, Sep. 2005.

Microsoft, "Computer Dictionary", Fifth Edition, p. 223, 2002.

Lee et al., "Architecting Phase Change Memory as a Scalable DRAM Alternative", ISCA '09 Proceedings of the 36th Annual International Symposium on Computer Architecture, pp. 2-13, Jun. 20-24, 2009.

Condit et al., "Better I/O Through Byte-Addressable, Persistent Memory", SOSP '09, Big Sky, Montana, pp. 33-146, Oct. 11, 2009.

The Notification of Transmittal of the International Search Report and the Written Opinion for Related PCT/US2016/031613, mailed Aug. 19, 2016.

Akel et al., "Onyx: A Prototype Phase Change Memory Storage Array," https://www.flashmemorysummit.com/English/Collaterals/Proceedings/2011/Proceedings_Chrono_2011.html, Flash Memory Summit 2011 Proceedings, Aug. 11, 2011.

Caulfield et al., "Moneta: A High-performance Storage Array Architecture for Next-generation, Non-volatile Memories", 43rd Annual IEEE/ACM International Symposium on Microarchitecture, 11 pages, Dec. 2010.

The Non-Volatile Systems Laboratory, "ECC and Data Coding for Non-Volatile Memories," http://nvsl.ucsd.edu/ecc, 3 pages, accessed May 19, 2017, May 25, 2012.

The Non-Volatile Systems Laboratory, "Moneta and Onyx: Very Fast SSDs," https://web.archive.org/web/20110429170453/http://nvsl.ucsd.edu:80/moneta/, 2 pages, Feb. 20, 2011.

Mearian, "IBM Announces Computer Memory Breakthrough Phase-Change Memory Offers 100 Times the Write Performance of NAND Flash," 6 pages, Jun. 30, 2011.

Hockmuth, "Phase Change Memory-Based 'Moneta' System Points to the Future of Computer Storage," http://ucsdnews.ucsd.edu/archive/newsrel/science/06-02-11data_frontier.asp, 2 pages, accessed May 19, 2017, Jun. 2, 2011.

Quereshi et al., "Scalable High Performance Main Memory System Using Phase-Change Memory Technology," ISCA '09 Proceedings of the 36th Annual International Symposium on Computer Architecture, 10 pages, Jun. 20-24, 2009.

Morrow, "Checksum vs. Torn Page Detection," http://colleenmorrow.com/2012/06/07/page_verify-checksum-vs-torn-page-detection/, 4 pages, accessed May 19, 2017, Jun. 7, 2012.

Bailey et al., "Operating System Implications of Fast, Cheap, Non-Volatile Memory," 13th USENIX, HOTOS11 2011, 5 pages, May 9-11, 2011.

Raoux et al., "Phase-Change Random Access Memory: A Scalable Technology," IBM Journal of Research and Development, vol. 52, Issue 4, pp. 465-479, Jul. 2008.

(56) References Cited

OTHER PUBLICATIONS

Chen et al., "Rethinking Database Algorithms for Phase Change Memory," 5th Biennial Conference on Innovative Data Systems Research (CIDR '11), Asilomar, California, USA, pp. 21-31, Jan. 9, 2011.

Dhiman et al., "PDRAM: A Hybrid PRAM and DRAM Main Memory System," Department of Computer Science and Engineering, 6 pages, Jul. 26, 2009.

Mogul et al., "Operating System Support for NVM+DRAM Hybrid Main Memory," 12th Workshop on Hot Topics in Operating Systems (HatOS XII), 9 pages, May 18, 2009.

Wu et al., "eNVy: A Non-Volatile, Main Memory Storage System," ASPLOS VI Proceedings of the Sixth International Conference on Architectural Support for Programming Languages and Operating Systems, 12 pages, Oct. 1994.

Freitas et al., "Storage-class memory: The next storage system technology," IBM Journal of Research and Development, vol. 52, Issue 4.5, pp. 438-447, Jul. 2008.

"The Non-Volatile Systems Laboratory NV-Heaps: Fast and Safe Persistent Objects," http://nvsl.ucsd.edu/nvuheaps/, 2 pgs., Sep. 1, 2011.

Kant, "Exploiting NVRAM for Building Multi-Level Memory Systems," International Workshop on Operating System Technologies for Large Scale NVRAM, Jeju, Korea, 19 pages, Oct. 21, 2008.

Jacob, "The Memory System You Can't Avoid It, You Can't Ignore It, You Can't Fake It," Morgan & Claypool, Synthesis Lectures on Computer Architecture, vol. 4, No. 1, pp. 1-77, Jun. 2009.

\* cited by examiner

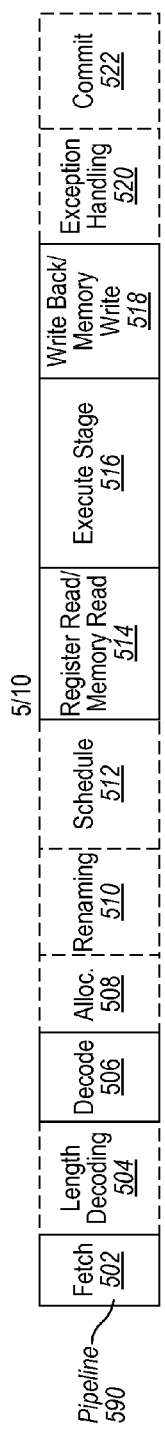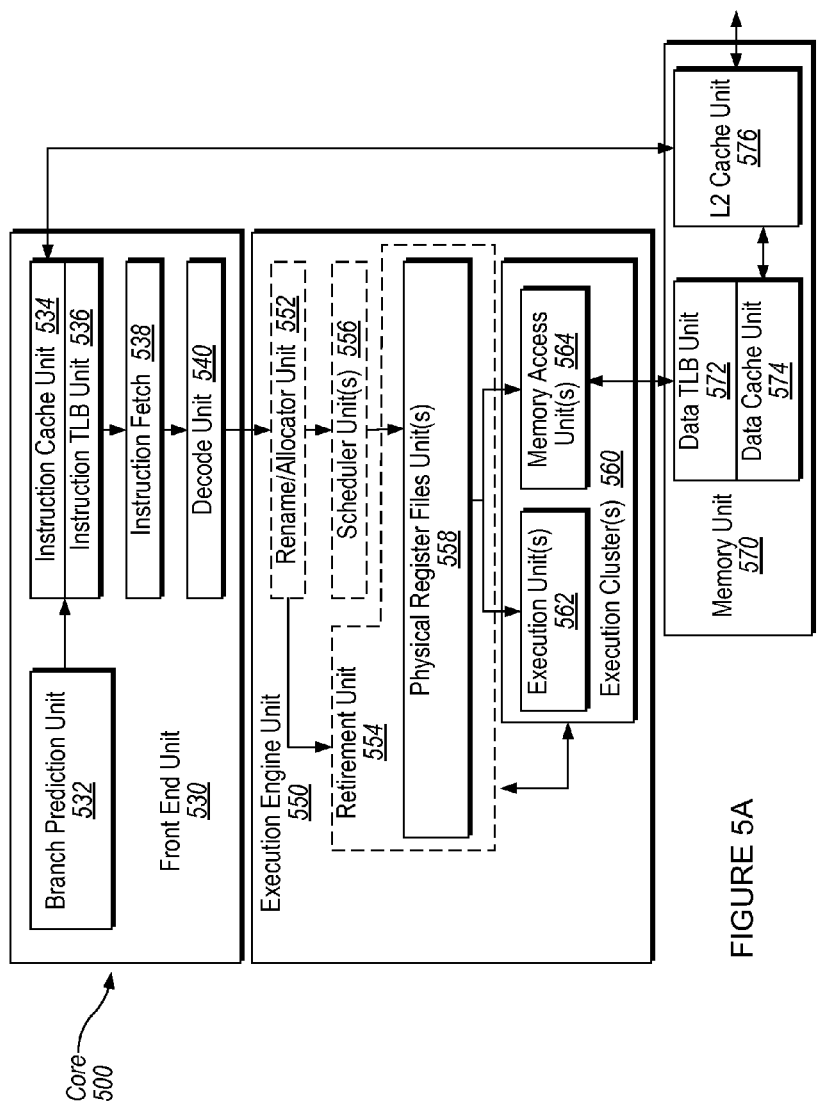

REDUCING LATENCY BY PERSISTING DATA RELATIONSHIPS IN RELATION TO CORRESPONDING DATA IN PERSISTENT MEMORY

The present disclosure pertains to the field of memory management and, in particular, to improving latency by persisting data relationships in relation to corresponding data in persistent memory.

BACKGROUND

Fast access memory, typically referred to as random access memory (RAM), is typically supplied within computers and computing devices in single in-line memory module (SIMM) format, and more commonly now, in dual in-line memory module (DIMM) format, and is generically referred to as dynamic RAM (or DRAM). DRAM is a volatile memory that loses data when the memory loses power or is otherwise reset.

Non-volatile memory, for example, block erasable non-volatile memory such as flash non-volatile memory (e.g., NAND flash), retains data even after losing power or being reset. NAND flash supports a finite number of write cycles, and failure is often gradual as individual cells wear out.

BRIEF DESCRIPTION OF THE DRAWINGS

FIG. 5A is a block diagram illustrating an in-order pipeline and a register renaming stage, out-of-order issue/execution pipeline according to one embodiment.

FIG. 5B is a block diagram illustrating a micro-architecture for a processor that implements compression/decompression optimization in solid-state memory devices according to one embodiment.

DESCRIPTION OF EMBODIMENTS

Figure 1:
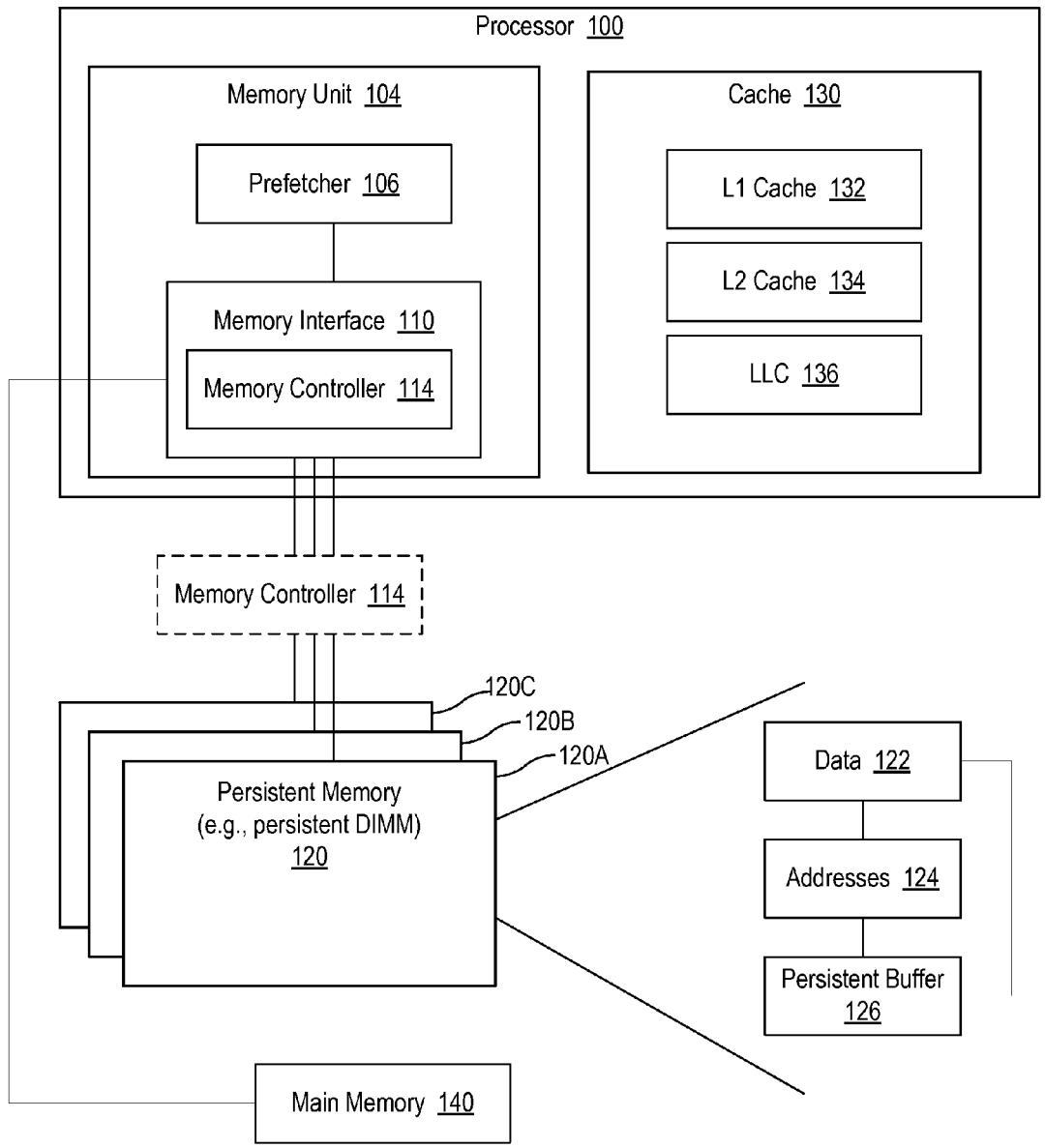
FIG. 1 is a diagram of an exemplary processor including a memory controller that may store data relationships in and prefetch corresponding data from persistent memory according to one embodiment.

Aspects of the present disclosure are directed to a type of bit-accessible (e.g., bit-addressable) memory that is persistent, referred to herein as persistent memory (PM). The PM described herein may include non-volatile memory such as three-dimensional (3D) cross-point memory, ferroelectric memory, silicon-oxide-nitride-oxide-silicon (SONOS) memory, polymer memory such as ferroelectric polymer memory, nanowire, ferroelectric transistor random access memory (FeTRAM or FeRAM), ovonic memory, nanowire, PCMS (phase change memory with switch), phase change memory, memristors, Spin Transfer Torque (STT)-magnetoresistive random access memory (MRAM) and MRAM. The embodiments described herein may further include PM disposed on memory modules, such as on dual in-line memory modules (DIMMs). Persistent memory does not lose data when disconnected from power or otherwise reset. The persistent memory may be bit-addressable or byte-addressable and those addresses do not change as long as the data persists at corresponding addresses. The PM devices described herein may be used in any computing scenario where rapid access to large amounts of data is required.

Persistent memory may have high latencies. For some operations (for example, scanning an array), prefetchers can help hide the latencies by fetching the next reference into volatile memory caches ahead of time. However, for many data structures, the next reference may be difficult to predict and prefetch because the prefetchers work within a small temporal window of address references and lack spatial access locality between addresses. For example, conventional prefetchers miss a large percentage of overlap in repeating addresses in pointer chasing due to walking a linked list or a skip list. Latencies for accessing data structures such as these can become prohibitively high and may impact performance.

These data patterns, however, do have repeatability in addresses traversed. For example, prefetchers may detect much repeatability over time in operations such as walking a linked list, searching a linked list, identifying where to insert a node in a linked list, traversing a graph, and the like, as these operations involve traversing the same linked list. This is the case even with seemingly random accesses.

Aspects of the present disclosure address the above and other deficiencies by persisting data relationships in relation to the corresponding data in persistent memory, given the repeatability in addresses being traversed. As a result, latency can be improved by accessing the relationship stored in the persistent memory in the prefetch process, making it more likely to prefetch data that will be accessed next in operations having such repeatability.

According to the aspects of the present disclosure, in one example, a processor or system may include a memory controller as part of a memory unit that includes a prefetcher or prefetching capability. The memory controller may store, in a pre-allocated portion of bit-addressable, random access persistent memory (PM), a relationship between a group of addresses being stored in the PM according to a set of instructions, when executed. For example, the relationship may be stored in conjunction with (and possibly linked to) the data in the PM corresponding to the group of addresses. Data corresponding to the group of addresses may be stored in the PM in relation to the addresses. The memory controller may further retrieve the relationship when later accessing an address from the group of addresses, and may prefetch data corresponding to the group of addresses to store locally, such as in a cache. The PM may be in form of a dual in-line memory module (DIMM), another memory module or as available to a processor or microcontroller on an IC. The relationship may be stored as a trace identifier or other identifier as will be explained in more detail.

In another example, the memory controller may store, in the pre-allocated portion of the PM, a relationship between a first address and an identified second address to which the first address often links according to a set of instructions. The memory controller may then retrieve the relationship when later accessing the first address, and prefetch data corresponding to the second address when reading the first address, storing the prefetched data into cache memory. Storing this relationship may be repeated for additional addresses within the set of instructions. In storing the relationship at a granularity of individual addresses, additional memory may be needed and so the memory controller may do so selectively for applications with a threshold level of repeatability, such as branch executions that are performed often but otherwise miss the cache on a frequent basis. Other criteria or programming may be used by the memory controller to identify sets of instructions for this level of granularity.

In this further example, the memory controller may build a persistent, key-values hash table that is stored in the pre-allocated portion of the PM with which to perform a lookup between the first address and the second address in view of a hash of the first address. The memory controller may, therefore, when reading the first address, perform a lookup in the key-values hash table to determine the data to prefetch that is related to the second address, anticipating that the second address will be read next. In some cases, the lookup results in two or more addresses that are often accessed after the first address. In these cases, the memory controller may hash the first address with other address data to determine which of the two or more addresses to prefetch. The memory controller may also know a code path that is being executed by an instruction pointer or can use branch prediction techniques to decide which of two or more addresses to choose from the hash table based on an outcome of a branch prediction in a piece of code.

FIG. 1 is a diagram of an exemplary processor 100 including a memory unit 104 having a prefetcher 106 that may store data relationships in and prefetch corresponding data from persistent memory 120, which may be employed as memory modules (such as SIMMs or DIMMs). In another embodiment, the memory unit 104 may be in another integrated circuit (IC) or a separate chip. In one embodiment, the persistent memory includes multiple persistent memory DIMMs 120A, 120B and 120C, which are representative of a number of DIMMs that may be available. The processor 100 may further include a cache 130, which may include an L1 cache 132, an L2 cache 134 and a last level cache (LLC) 136 for example, although the cache 130 may include additional levels.

The processor 100 may be a part of a larger system, which may be located on a motherboard substrate (such as a printed circuit board) including a socket for the processor 100 and sockets into which the DIMMs 120A, 120B and 120C may be releasably inserted.

The memory unit may further include a memory interface 110, which may include a memory controller 114 that the prefetcher 106 may direct to speculatively prefetch data from the persistent memory 120 and from main memory 140 (e.g., volatile memory or DRAM), where in some cases, the persistent memory 120 may be the main memory 140. For example, when it is determined that it is likely that data at address D will be accessed after data is accessed at address B, the prefetcher 106 may search for address B in the cache 130 (which may itself be persistent memory in one embodiment). If the prefetcher 106 receives a cache miss (e.g., in the LLC 136), then the prefetcher 106 may look for address B in the persistent memory DIMMs 120A, 120B and 120C, and getting a hit, may store the data into the cache 130. These misses are associated with latencies and the more misses for addresses in the cache 130 and the persistent memory DIMMs 120A, 120B and 120C, the more accesses to main memory will delay processing of operations associated with applications the processor 100 executes when compared with the prefetcher 106 having a higher successful prefetching rate.

The persistent memory 120 may include a certain amount of memory to which to store data 122 and addresses 124 associated with the data, e.g., indicating a physical location of the data on the persistent memory 120. When data from the persistent memory DIMMs 120A, 120B or 120C is stored into the cache 130, the physical addresses may be organized by virtual address or physical address depending on the level of cache for performance reasons. A virtual to physical address translation, if present, may be stored in a page table, parts of which may be stored as metadata in the cache 130 or may be cached in a translation lookaside buffer.

The persistent memory 120 may also include a pre-allocated portion of memory, which in one embodiment may be referred to as a persistent buffer 126, in which to store relationships between the addresses 124, e.g., between a group of two or more addresses. Many such relationships may be created when traversing a linked list, a skip list, a graph or performing lookups in hash tables. The relationships may be stored as related, and optionally linked, to the data corresponding to the group of addresses. For example, the relationships may include links or references between an address and one or more other addresses. In one embodiment, the pre-allocated portion of the persistent memory 120 may include a part of a memory array linked to the data corresponding to the group of addresses, thus being stored local to the data. In another embodiment, the relationship is stored in the persistent buffer 126 in association with the group of two or more addresses, but not directly linked to the data. In yet another example, the relationships stored in the persistent buffer 126 may be physically linked to the data corresponding to the two or more addresses. Being physically linked to the data may include the relationship being stored together with the data in the same physical device or memory unit.

Figure 2:
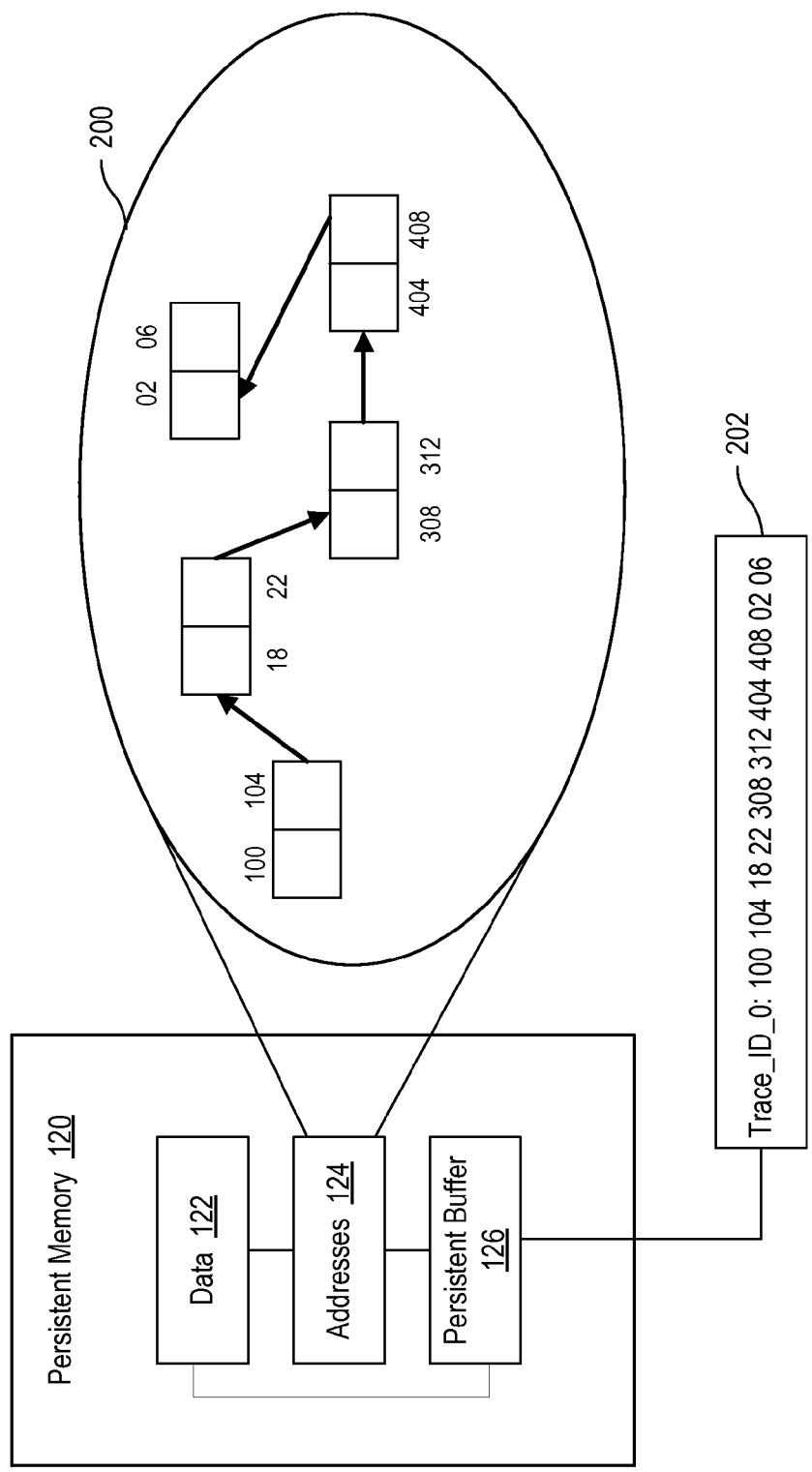
FIG. 2 is a diagram of an exemplary data trace through linked data as stored in persistent memory, together with an associated trace identifier according to one embodiment.

With additional reference to FIG. 2, the prefetcher 106 (or memory controller 114) may request a trace 200 of traversal of a linked list stored in the persistent memory 120 and store locations and pointers of the linked list in the persistent buffer 126 associated with a trace identifier 202 for the trace, thus storing the relationship between addresses of the linked list. The prefetcher may also detect the relationship between a group of addresses, from a first address to a last address, for example, as shown in FIG. 2.

The prefetcher 106 may be adapted to recognize a linked list or other array of correlated addresses so as to know to request the trace and store the relationship between addresses that reference each other. For example, the prefetcher 106 may detect a higher number of cache misses and tag instructions associated with the cache misses as possible candidates for storing relationships. The processor 100 may further include a counter that monitors aspects in the micro-architecture of the processor 100, to include, for example, detecting performance of the processor 100 dropping below a certain threshold. Certain applications the processor 100 executes may also insert markers within the instructions of the application as a warning of possible poor performance, and therefore, signal to the prefetcher to store relationships between referenced or linked addresses to reduce latencies.

More specifically, and with further reference to FIGS. 1 and 2, the prefetcher 106 may be configured to execute new instructions, including, by way of example:

TRC_BEGIN(N) // begin tracing and remembering memory addresses for trace ID_N

TRC_END(N) // end tracing and remembering memory addresses for trace ID_N

TRC_FETCH(N) // fetch trace of memory addresses for trace ID_N

As an example, the prefetcher 106 may ask for a linked list traversal of persistent memory to be traced and the trace stored in the persistent memory as being associated with corresponding data. The location and pointers of the linked list in the persistent memory 120 are fixed and permanent, unless the list is deleted or modified in structure by the application. The tracing may be invoked the first time the entire list is traversed.

TRC_BEGIN(0);
traverse_linked_list(node*head);
TRC_END(0).

The addresses referenced in the persistent memory 120 between the TRC_BEGIN and TRC_END points may be stored in the persistent buffer 126, and associated with a trace identifier such as trace_ID_0, labeled as 202 in FIG. 2. In other words, the prefetcher 106 has indicated to the persistent memory that the addresses between TRC_BEGIN and TRC_END are related to each other and that relationship needs to be stored (or "persisted") together in the persistent buffer 126. This association between the addresses is durable as the memory is persistent, and may be performed at a granularity of the way the data is stored within the persistent memory 120, further speeding up the prefetch process. Note that permissions to persistent memory regions of the persistent memory 120 may be handled like file permissions or with protection schemes, so as to protect against rogue programs corrupting or misusing these instructions.

While performing any linked list operations on the list, the prefetcher 106 may invoke the fetch, as follows:

TRC_FETCH(0);
query_linked_list(value query_value, node*head).

When the prefetcher 106 encounters TRC_FETCH(0), the addresses associated with the trace_ID_0 on the DIMM (or other persistent memory) may be prefetched. Thus the application does not have to encounter the latency for referencing the set of addresses when it queries or operates on the list.

Even though virtual addresses of the prefetcher 106 to persistent memory mapping may change, the addresses are stored at DIMM (or other persistent memory) granularity and therefore are persistent memory addresses. Accordingly, it is advantageous in at least one embodiment for the persistent buffer 126 to store the relationships between the data to be situated along with, or linked to, the data on the DIMM. As the prefetcher 106 references book-keeping information from persistent memory to map its pointers to the new virtual address space, the prefetcher 106 may also recover the semantic association with the trace IDs. The 3D XPoint® DIMMs are expected to have sizes into terabyte(s) of capacity. Buffer sizes in the order of megabytes or a few gigabytes, therefore, should be able to contain large traces of data relationships without incurring significant additional overhead.

Figure 3:
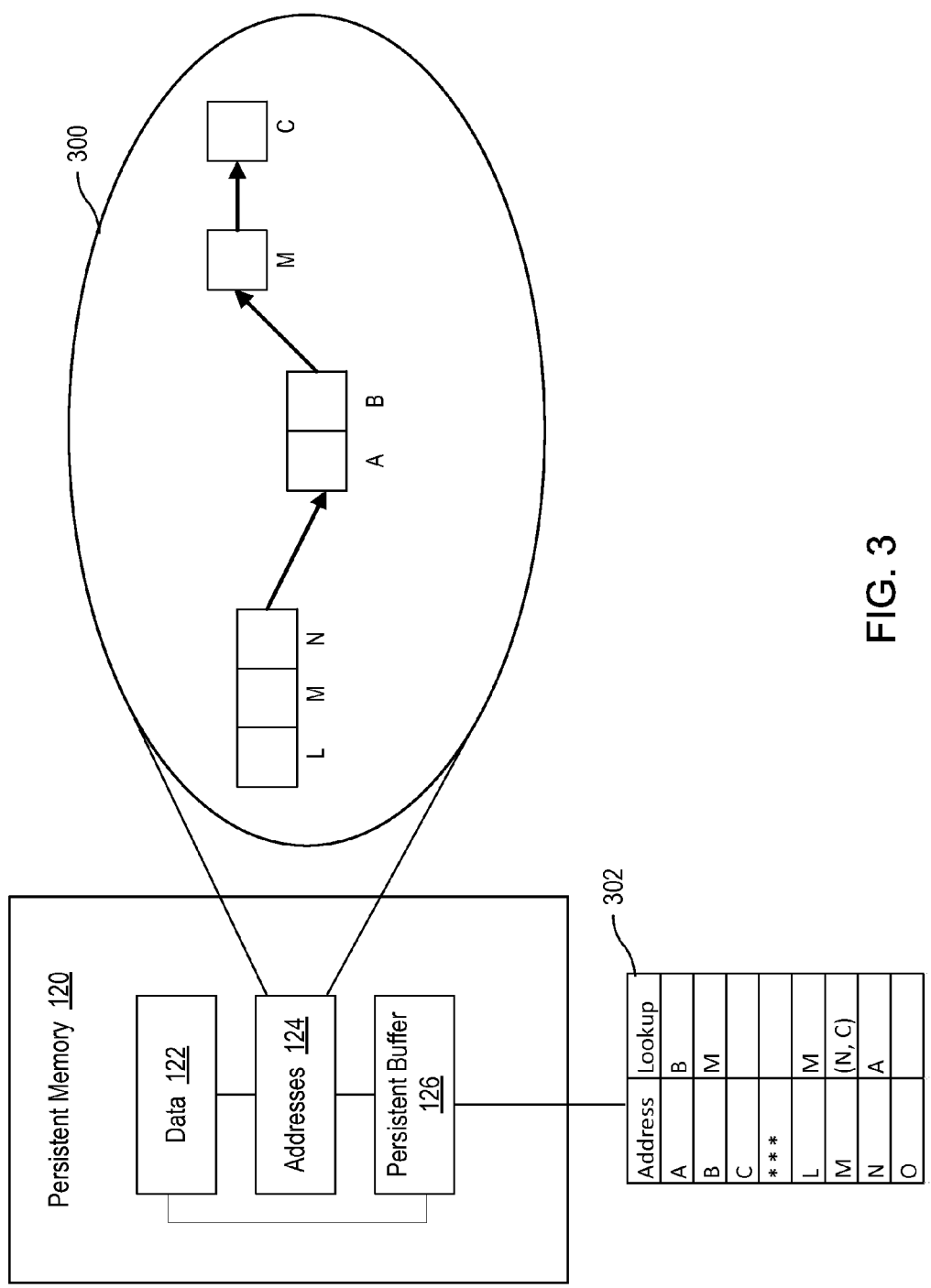
FIG. 3 is a diagram of an exemplary data trace through linked data as stored in persistent memory, together with an associated hash lookup table according to one embodiment.

FIG. 3 is a diagram of an exemplary data trace 300 through linked data as stored in persistent memory 120, together with an associated hash lookup table 302 according to one embodiment. This embodiment may be a finer grained implementation than that of FIG. 2 (in which the TRC_BEGIN and TRC_END instructions are executed), to store relationships at individual address granularity instead of for a set of addresses. Accordingly, when the prefetcher 106 executes TRC_BEGIN, the prefetcher 106 may walk an address sequence L, M, N, A, B, M, C as per the example of FIG. 3. More specifically, when the prefetcher 106 requests the trace 300, the prefetcher 106 may build a persistent key-values hash table 302 of key L→M, of the key M→(N, C) as M occurs twice, of the key N→A, and so forth. The TRC_FETCH operation may also be overloaded to fetch the relationships at individual address granularity so that TRC_FETCH(0, address N) would hash N and get the value A (since N→A). The prefetcher 106 may then hash A and get the value B, and so forth to walk the hash table 302 up to a specified depth for a set of instructions.

The look up of address M may result in choice of either address N or address C. The prefetcher 106 knows the instructions pointer and, therefore, a code path being executed. The same address can be referenced through different code paths and the choice from two or more subsequent addresses to prefetch may be made based on the code path, which the prefetcher 106 knows. Additionally, branch prediction techniques may be used to decide which of two or more addresses to choose from the hash table. In this way, the prefetcher 106 may understand, build and recognize relationships between data associated with these branching addresses, which can be leveraged to more accurately choose the correct address of multiple addresses that may be viable choices in the hash table 302.

Figure 4:
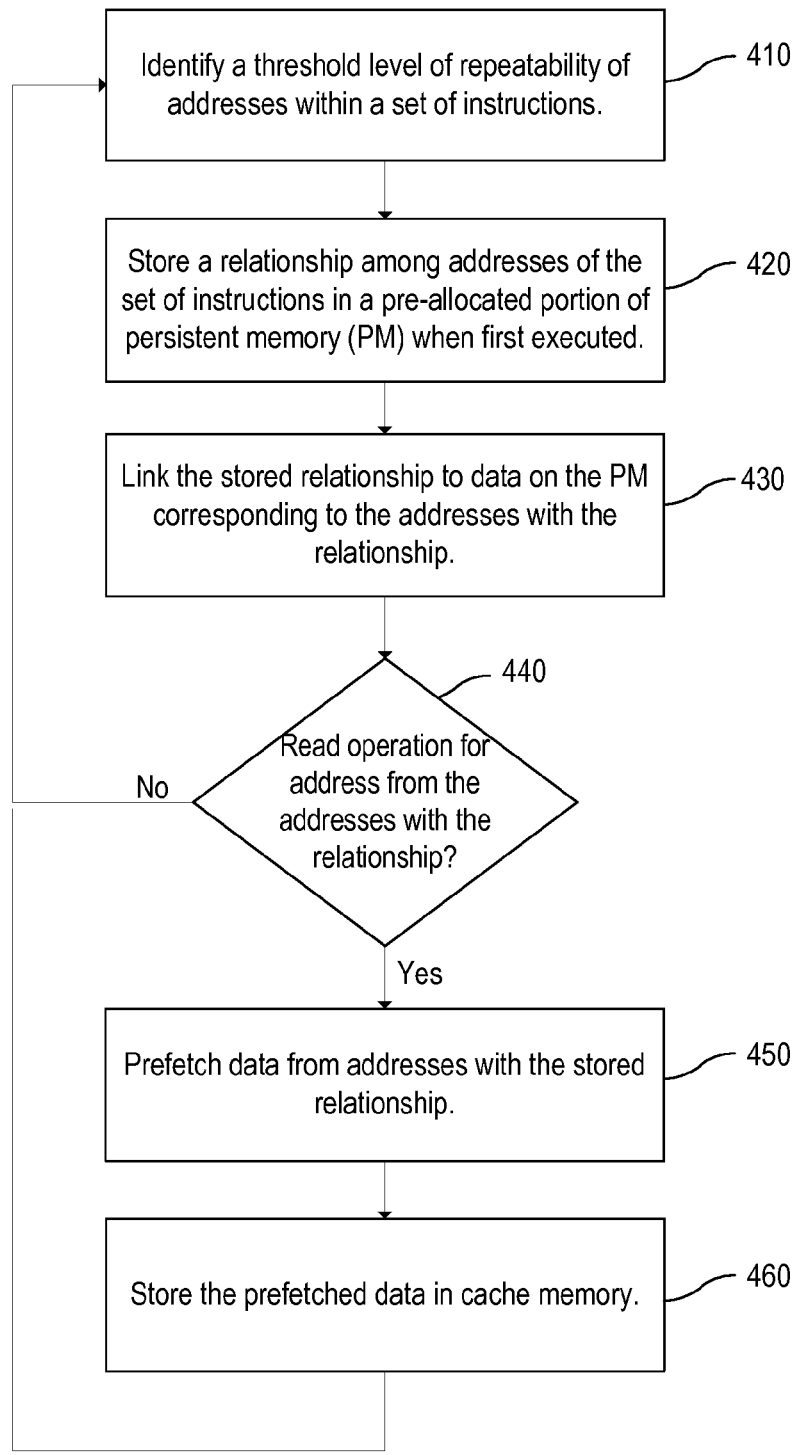
FIG. 4 is a flowchart of an exemplary method for storing a relationship between addresses in persistent memory, and prefetching data of the addresses also stored in the persistent memory according to one embodiment.

FIG. 4 is a flowchart of an exemplary method for storing a relationship between addresses in persistent memory, and prefetching data of the addresses also stored in the persistent memory according to one embodiment. The processor 100 (or a processor core, or other system or apparatus) may perform the method with the majority of the steps executed by the prefetcher 106 (FIG. 1). Not all of the steps are needed and different or additional steps may be inserted into the method of FIG. 4 as would be apparent to one skilled in the art having the benefit of this disclosure.

The processor may identify a threshold level of repeatability of addresses within a set of instructions (410). The prefetcher may store a relationship among addresses of the set of instructions in a pre-allocated portion of the persistent memory (PM), such as in a persistent buffer, when first executed (420). The prefetcher may store this relationship in relation to the data corresponding to these addresses in at least one of multiple ways, two examples of which are discussed with reference to FIGS. 2 and 3. The prefetcher may also, in one embodiment, link the stored relationship to the data on the PM corresponding to addresses with the relationship (430).

Once the relationship persists on the PM, the prefetcher may then determine whether the processor is executing a read operation for an address from among the addresses with the stored relationship (440). When the prefetcher detects a read operation, the prefetcher may prefetch data from addresses with the stored relationship (450). This prefetch may be performed for a group of addresses associated with a trace identifier as in FIG. 2 or for individual addresses prefetched in a sequence according to a hash (or other lookup table) such as discussed with reference to FIG. 3. The prefetcher may then store the prefetched data in cache or other fast access memory (460) for use by the processor (SOC or other system) to speed up memory accesses.

FIG. 5A is a block diagram illustrating a micro-architecture for a processor core 500 that may execute the processor 100, or other system of FIGS. 1-3 according to one embodiment. Specifically, processor core 500 depicts an in-order architecture core and a register renaming logic, out-of-order issue/execution logic to be included in a processor according to at least one embodiment of the disclosure. The embodiments of the error correcting code that carry additional bits may be implemented by processor core 500.

The processor core 500 includes a front end unit 530 coupled to an execution engine unit 550, and both are coupled to a memory unit 570. The processor core 500 may include a reduced instruction set computing (RISC) core, a complex instruction set computing (CISC) core, a very long instruction word (VLIW) core, or a hybrid or alternative core type. As yet another option, processor core 500 may include a special-purpose core, such as, for example, a network or communication core, compression engine, graphics core, or the like. In one embodiment, processor core 500 may be a multi-core processor or may be part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the primary instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 may be coupled to the physical register file unit(s) 558. Each of the physical register file unit(s) 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 may be overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 may be coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 (or prefetcher 106) speculatively loads/prefetches data to the DCU 574 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or to prefetch buffer before the processor issues a demand for the specific data being returned.

The processor core 500 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processor core 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 590 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
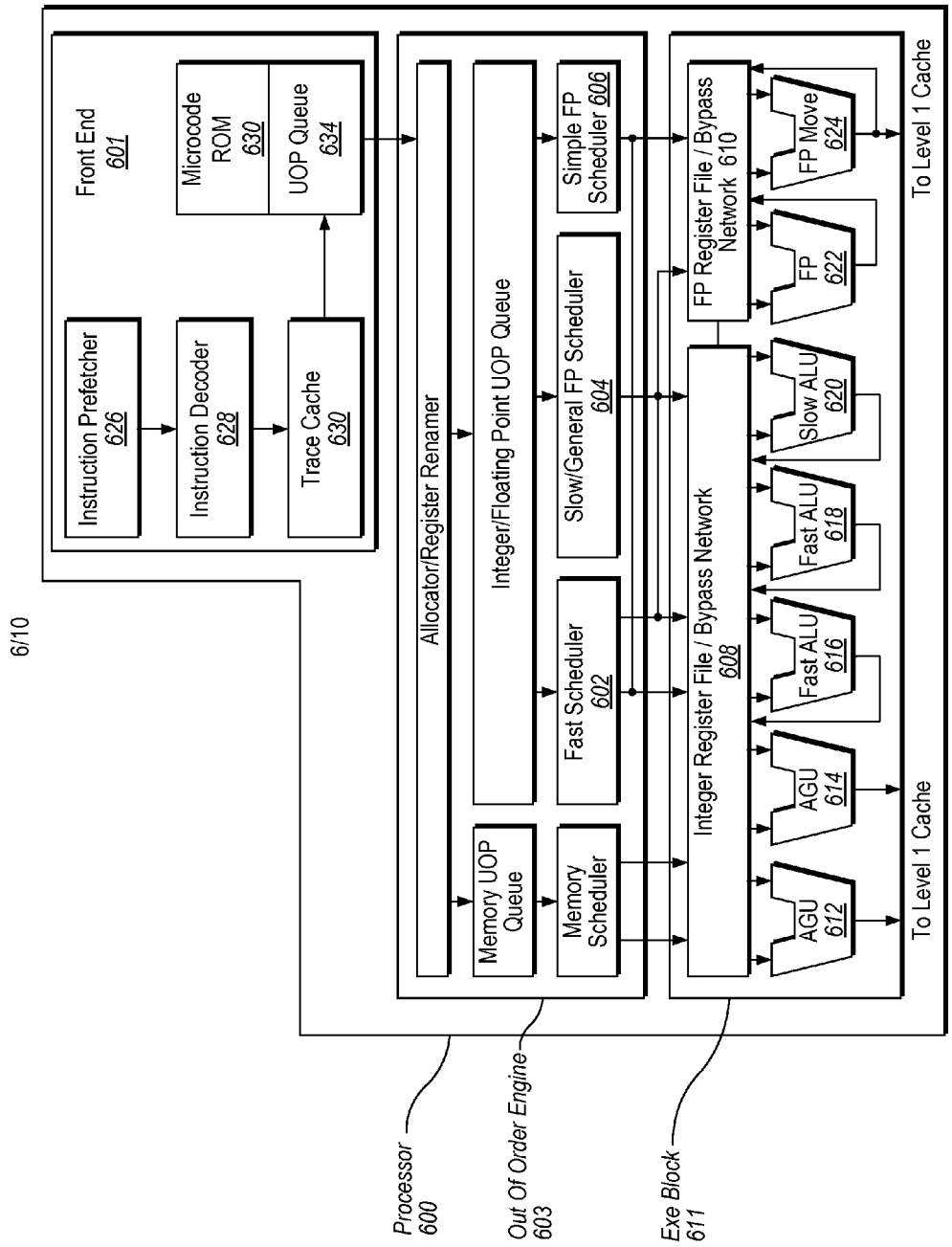
FIG. 6 illustrates a block diagram of the micro-architecture for a processor that includes logic circuits to perform compression/decompression optimization in solid-state memory devices according to one embodiment.

FIG. 6 illustrates a block diagram of the micro-architecture for a processor 600 that includes logic circuits that may execute the processor 100, a chip or other system of FIGS. 1-3 according to one embodiment. In some embodiments, an instruction in accordance with one embodiment may be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 (or prefetcher 106) fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM (or RAM) 632 may provide the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction may be decoded into a small number of micro ops for processing at the instruction decoder 628. In another embodiment, an instruction may be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment may schedule on each half of the main clock cycle while the other schedulers may only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that may bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 614. For one embodiment, the floating point execution blocks 622, 624, execute floating point, MMX, SIMD, and SSE, or other operations. The floating point ALU 622 of one embodiment includes a 64-bit-by-64-bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment may execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, may be implemented to support a variety of data bits including 16, 32, 128, 256, etc. Similarly, the floating point units 622, 624, may be implemented to support a range of operands having bits of various widths. For one embodiment, the floating point units 622, 624, may operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
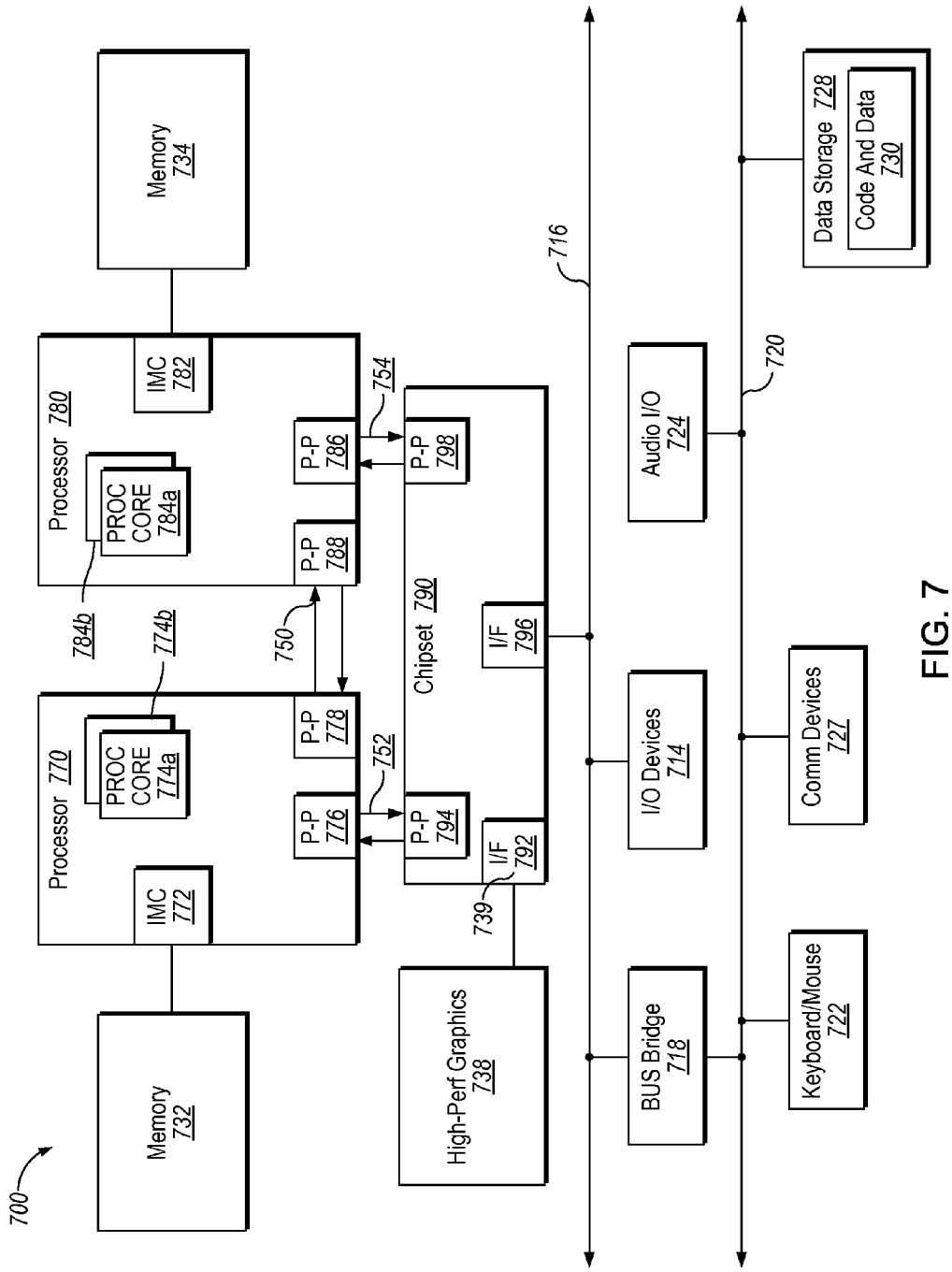
FIG. 7 is a block diagram of a computer system according to one implementation.

Embodiments may be implemented in many different system types. Referring now to FIG. 7, shown is a block diagram of a multiprocessor system 700 in accordance with an implementation. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774*a* and 774*b* and processor cores 784*a* and 784*b*), although potentially many more cores may be present in the processors. The processors each may include hybrid write mode logics in accordance with an embodiment of the present. The embodiments of the page additions and content copying can be implemented in the processor 770, processor 780, or both.

While shown with two processors 770, 780, it is to be understood that the scope of the present disclosure is not so limited. In other implementations, one or more additional processors may be present in a given processor.

Processors 770 and 780 are shown including integrated memory controller units 772 and 782, respectively. Processor 770 also includes as part of its bus controller units point-to-point (P-P) interfaces 776 and 788; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors or may be persistent memory (PM) in DIMM(s). The IMCs 772 and 782 may function as the memory controller 114 with the prefetcher 106.

Processors 770, 780 may each exchange information with an input/output controller 790 via individual P-P interfaces 752, 754 using point to point interface circuits 776, 794, 786, 798. Input/output controller 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Input/output controller 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
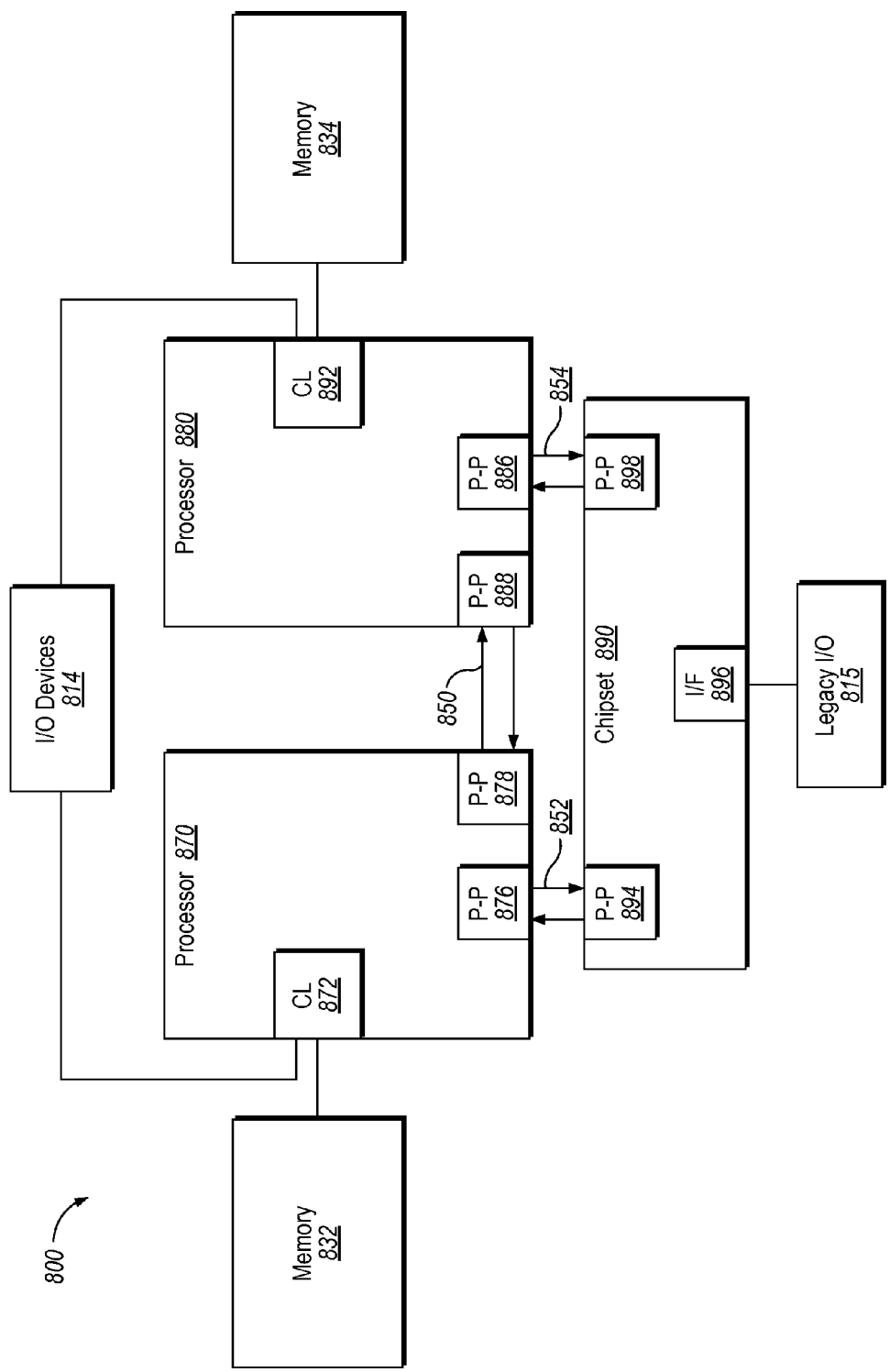
FIG. 8 is a block diagram of a computer system according to another implementation.

Referring now to FIG. 8, shown is a block diagram of a third system 800 in accordance with an embodiment of the present disclosure. Like elements in FIGS. 7 and 8 bear like reference numerals, and certain aspects of FIG. 7 have been omitted from FIG. 7 in order to avoid obscuring other aspects of FIG. 8.

FIG. 8 illustrates that the processors 870, 880 may include integrated memory and I/O control logic ("CL") 872 and 882, respectively. For at least one embodiment, the CL 872, 882 may include integrated memory controller units such as described herein. In addition. CL 872, 882 may also include I/O control logic. FIG. 8 illustrates that the memories 832, 834 are coupled to the CL 872, 882, and that I/O devices 814 are also coupled to the control logic 872, 882. Legacy I/O devices 815 are coupled to the chipset 890. The embodiments of the page additions and content copying can be implemented in processor 870, processor 880, or both.

Figure 9:
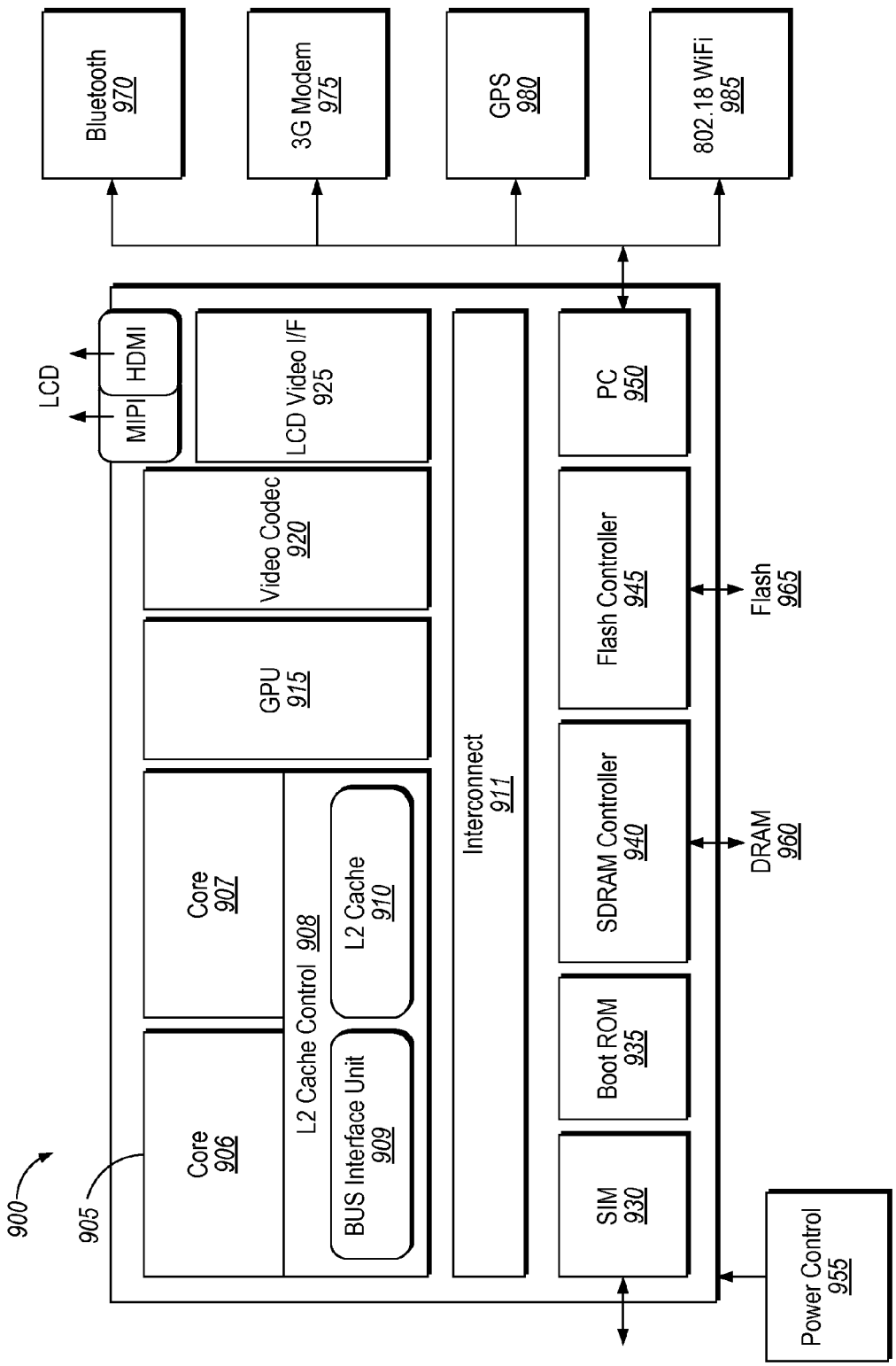
FIG. 9 illustrates another implementation of a block diagram for a computing system.

Turning next to FIG. 9, an embodiment of a system on-chip (SoC) design in accordance with embodiments of the disclosure is depicted. As an illustrative example, SoC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 900.

Here, SoC 900 includes 2 cores—906 and 907. Similar to the discussion above, cores 906 and 907 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of SOC 900. Interconnect 911 includes an on-chip interconnect, such as an IOSF, AMBA, or other interconnects discussed above, which can implement one or more aspects of the described disclosure.

Interconnect 911 provides communication channels to the other components, such as a Subscriber Identity Module (SIM) 930 to interface with a SIM card, a boot ROM 935 to hold boot code for execution by cores 906 and 907 to initialize and boot SoC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the embodiments described herein.

In addition, the system illustrates peripherals for communication, such as a Bluetooth module 970, 3G modem 975, GPS 980, and Wi-Fi 985. Note as stated above, a UE includes a radio for communication. As a result, these peripheral communication modules may not all be included. However, in a UE some form of a radio for external communication should be included.

Figure 10:
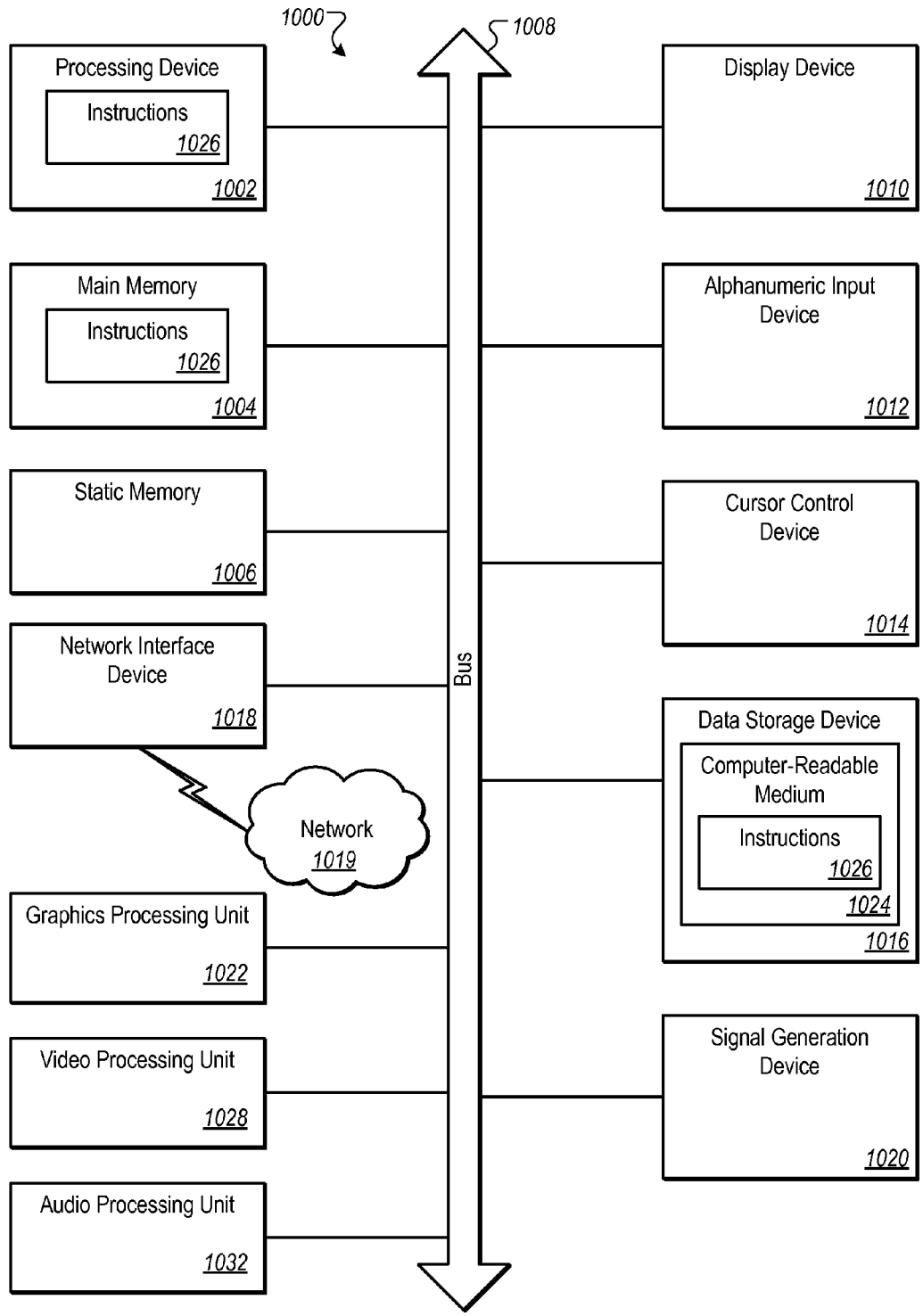
FIG. 10 illustrates another implementation of a block diagram for a computing system.

FIG. 10 illustrates a diagrammatic representation of a machine in the example form of a computing system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments that execute the processor 100 or other system of FIGS. 1-3 may be implemented in the computing system 1000.

The computing system 1000 includes a processing device 1002, main memory 1004 (e.g., flash memory, dynamic random access memory (DRAM) (such as synchronous DRAM (SDRAM) or DRAM (RDRAM), etc.), a static memory 1006 (e.g., persistent memory as shown in FIG. 1, static random access memory (SRAM), etc.), and a data storage device 1016, which communicate with each other via a bus 1008.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In one embodiment, processing device 1002 may include one or processor cores. The processing device 1002 is configured to execute the processing logic or instructions 1026 for performing the operations discussed herein.

In one embodiment, processing device 1002 may be the processor 100 of FIG. 1. Alternatively, the computing system 1000 may include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1000 may further include a network interface device 1018 communicably coupled to a network 1019. The computing system 1000 also may include a video display device 1010 (e.g., a liquid crystal display (LCD) or a cathode ray tube (CRT)), an alphanumeric input device 1012 (e.g., a keyboard), a cursor control device 1014 (e.g., a mouse), a signal generation device 1020 (e.g., a speaker), or other peripheral devices. Furthermore, computing system 1000 may include a graphics processing unit 1022, a video processing unit 1028 and an audio processing unit 1032. In another embodiment, the computing system 1000 may include a chipset (not illustrated), which refers to a group of integrated circuits, or chips, that are designed to work with the processing device 1002 and controls communications between the processing device 1002 and external devices. For example, the chipset may be a set of chips on a motherboard that links the processing device 1002 to very high-speed devices, such as main memory 1004 and graphic controllers, as well as linking the processing device 1002 to lower-speed peripheral buses of peripherals, such as USB, PCI or ISA buses.

The data storage device 1016 may include a computer-readable storage medium 1024 (which may be persistent memory (PM)) on which is stored software 1026 embodying any one or more of the methodologies of functions described herein. The software 1026 may also reside, completely or at least partially, within the main memory 1004 as instructions 1026 and/or within the processing device 1002 as processing logic during execution thereof by the computing system 1000; the main memory 1004 and the processing device 1002 also constituting computer-readable storage media.

The computer-readable storage medium 1024 may also be used to store instructions 1026 utilizing the processing device 1002, such as described with respect to FIGS. 1-4, and/or a software library containing methods that call the above applications. While the computer-readable storage medium 1024 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is an apparatus comprising: 1) a memory controller to: a) store, in a pre-allocated portion of a bit-addressable, random access persistent memory, a relationship between a group of addresses being stored in the persistent memory according to a set of instructions, when executed; and b) retrieve the relationship when accessing an address from the group of addresses.

In Example 2, the apparatus of Example 1, wherein, to store the relationship in the pre-allocated portion, the memory controller is further to: a) request a trace of traversal of a linked list stored in the persistent memory; and b) store locations and pointers of the linked list in the pre-allocated portion and associated with a trace identifier for the trace.

In Example 3, the apparatus of Example 2, wherein the memory controller is further to detect the relationship between the group of addresses, wherein the relationship spans between a first address and a last address.

In Example 4, the apparatus of Example 1, wherein the pre-allocated portion of the persistent memory comprises a part of a memory array that is linked to data corresponding to the group of addresses.

In Example 5, the apparatus of Example 1, wherein the pre-allocated portion of the persistent memory comprises a persistent memory buffer.

In Example 6, the apparatus of Examples 1-5, wherein, to store the relationship in the pre-allocated portion, the memory controller is to physically link the relationship to data corresponding to the group of addresses.

In Example 7, the apparatus of Example 1, wherein the memory controller is further to prefetch data corresponding to the group of addresses to be stored locally in a cache.

In Example 8, the apparatus of Examples 1-7, wherein the persistent memory is disposed on a circuit board within a dual in-line memory module (DIMM).

Various embodiments may have different combinations of the structural features described above. For instance, all optional features of the computing system described above may also be implemented with respect to the method or process described herein and specifics in the examples may be used anywhere in one or more embodiments.

Example 9 is a processor comprising: 1) a cache; 2) a memory unit including a memory controller to store, in a pre-allocated portion of a bit-addressable, random access persistent memory disposed on a dual in-line memory module (DIMM), a relationship between a first address and an identified second address to which the first address links according to a set of instructions; 2) wherein the memory controller is further to: a) retrieve the relationship when accessing the first address; and b) prefetch data corresponding to the second address when reading the first address, to store the data locally in the cache.

In Example 10, the processor of Example 9, wherein the pre-allocated portion of the persistent memory comprises a persistent buffer, and wherein the memory controller is further to: a) build a persistent, key-values hash table that is stored in the persistent buffer with which to perform a lookup between the first address and the second address in view of a hash of the first address; and b) when reading the first address, perform a lookup in the persistent, key-values hash table to determine the data to prefetch comprises data related to the second address.

In Example 11, the processor of Example 10, wherein when the first address also links to a third address according to the set of instructions, and the memory controller is further to: a) store a hash of the third address in the persistent memory as also corresponding to the first address; and b) when reading the first address, decide whether to prefetch data related to the second address or the third address when performing a lookup in the persistent, key-values hash table, depending on a code path within the set of instructions being executed.

In Example 12, the processor of Example 10, wherein, to store the relationship in the persistent buffer, the memory controller is further to: a) request a trace of traversal of a linked list stored in the persistent memory and associated with the set of instructions, wherein the linked list is associated with a plurality of addresses including the first address and the second address; and b) store locations and pointers of the plurality of addresses of the linked list in the persistent, key-values hash table and associated with respective addresses of the plurality of addresses.

In Example 13, the processor of Example 9, wherein to store the relationship, the memory controller is to physically link the relationship to the data corresponding to the second address.

In Example 14, the processor of Example 9, wherein the set of instructions corresponds to an application that executes an operation comprising: pointer chasing, graph traversal or lookups in a hash table.

In Example 15, the processor of Example 9, wherein the memory controller is further to identify an application including the set of instructions by a level of repeatability of addresses within the set of instructions.

Various embodiments may have different combinations of the structural features described above. For instance, all optional features of the processors and methods described above may also be implemented with respect to a system described herein and specifics in the examples may be used anywhere in one or more embodiments.

Example 16 is method, comprising: 1) storing, by a memory controller executed by a processor and in a pre-allocated portion of a bit-addressable, random access persistent memory, a relationship between a group of addresses being stored in the persistent memory according to a set of instructions, when executed; and 2) retrieving, by the memory controller, the relationship when accessing an address from the group of addresses.

In Example 17, the method of Example 16, wherein the storing comprises the memory controller: 1) detecting the relationship between the group of addresses; 2) requesting a trace of traversal of a linked list stored in the persistent memory; and 3) storing locations and pointers of the linked list in the pre-allocated portion and associated with a trace identifier for the trace.

In Example 18, the method of Examples 17, wherein storing the relationship in the pre-allocated portion comprises storing the relationship in a part of a memory array that is linked to data corresponding to the group of addresses.

In Example 19, the method of Examples 16, wherein storing the relationship in the pre-allocated portion comprises storing the relationship in a persistent memory buffer, and wherein the persistent memory is disposed on a circuit board of a dual in-line memory module (DIMM).

In Example 20, the method of Example 16, wherein the storing comprises physically linking the relationship to data corresponding to the group of addresses, the method further comprising prefetching, by the memory controller, data corresponding to the group of addresses within the relationship to be stored locally, in response to the retrieving.

Various embodiments may have different combinations of the structural features described above. For instance, all optional features of the processors and methods described above may also be implemented with respect to a system described herein and specifics in the examples may be used anywhere in one or more embodiments.

In Example 21, a system comprises: 1) a motherboard substrate having a first socket and a second socket, wherein a processor is inserted into the first socket and an integrated circuit containing bit-addressable, random access persistent memory is inserted in the second socket; 2) wherein the processor comprises a memory controller to: a) store, in a pre-allocated portion of the persistent memory, a relationship between a group of addresses being stored in the persistent memory according to a set of instructions, when executed; and b) retrieve the relationship when accessing an address from the group of addresses.

In Example 22, the system of Example 21, wherein, to store the relationship in the pre-allocated portion, the memory controller is further to: a) detect the relationship between the group of addresses; b) request a trace of traversal of a linked list stored in the persistent memory; and c) store locations and pointers of the linked list in the pre-allocated portion and associated with a trace identifier for the trace.

In Example 23, the system of Example 21, wherein the pre-allocated portion of the persistent memory comprises a part of a memory array that is linked to data corresponding to the group of addresses.

In Example 24, the system of Example 21, wherein the pre-allocated portion of the persistent memory comprises a persistent memory buffer.

In Example 25, the system of Example 21, wherein, to store the relationship in the pre-allocated portion, the memory controller is to physically link the relationship to data corresponding to the group of addresses, and wherein the memory controller is further to prefetch the data corresponding to the group of addresses to be stored locally in a cache.

Various embodiments may have different combinations of the structural features described above. For instance, all optional features of the processors and methods described above may also be implemented with respect to a system described herein and specifics in the examples may be used anywhere in one or more embodiments.

In Example 26, a system comprises: 1) a motherboard; 2) a processor disposed on the motherboard; 3) a bit-addressable random access persistent memory disposed on the motherboard; and 4) a memory controller operatively coupled to the bit-addressable random access persistent memory, the memory controller to: a) store, in a pre-allocated portion of the persistent memory, a relationship between a group of addresses being stored in the persistent memory according to a set of instructions, when executed; and b) retrieve the relationship when accessing an address from the group of addresses.

In Example 27, the system of Example 26, wherein the memory controller resides in the processor.

In Example 28, the system of Example 26, wherein the memory controller is coupled between the processor and the persistent memory.

In Example 29, the system of Example 26, wherein the pre-allocated portion of the persistent memory comprises a part of a memory array that is linked to data corresponding to the group of addresses.

In Example 30, the system of Example 26, wherein the pre-allocated portion of the persistent memory comprises a persistent memory buffer.

In Example 31, the system of Example 26, wherein, to store the relationship in the pre-allocated portion, the memory controller is to physically link the relationship to data corresponding to the group of addresses.

In Example 32, the system of Example 26, wherein the memory controller is further to prefetch the data corresponding to the group of addresses to be stored locally in a cache.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to compression/decompression optimization in solid-state memory devices in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) can be beneficial to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored in a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored in a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. An apparatus comprising:
   a memory controller to:
      store, in a pre-allocated portion of a bit-addressable, random access persistent memory, information indicating a relationship between a group of addresses being stored in the persistent memory according to a set of instructions, when executed; and
      retrieve the relationship from the information when accessing an address from the group of addresses.

2. The apparatus of claim 1, wherein, to store the information indicating the relationship in the pre-allocated portion, the memory controller is further to:
   request a trace of traversal of a linked list stored in the persistent memory; and
   store locations and pointers of the linked list in the pre-allocated portion and associated with a trace identifier for the trace.

3. The apparatus of claim 2, wherein the memory controller is further to detect the relationship between the group of addresses, wherein the relationship spans between a first address and a last address.

4. The apparatus of claim 1, wherein the pre-allocated portion of the persistent memory comprises a part of a memory array that is linked to data corresponding to the group of addresses.

5. The apparatus of claim 1, wherein the pre-allocated portion of the persistent memory comprises a persistent memory buffer.

6. The apparatus of claim 1, wherein, to store information indicating the relationship in the pre-allocated portion, the memory controller is to physically link the information to data corresponding to the group of addresses.

7. The apparatus of claim 1, wherein the memory controller is further to prefetch data corresponding to the group of addresses to be stored locally in a cache.

8. The apparatus of claim 1, wherein the persistent memory is disposed on a circuit board of a dual in-line memory module (DIMM).

9. A processor comprising:
   a cache;
   a memory unit including a memory controller to store, in a pre-allocated portion of a bit-addressable, random access persistent memory disposed on a dual in-line memory module (DIMM), information indicating a relationship between a first address and an identified second address to which the first address links according to a set of instructions;
   wherein the memory controller is further to:
      retrieve the relationship from the information when accessing the first address; and
      prefetch data corresponding to the identified second address when reading the first address, to store the data locally in the cache.

10. The processor of claim 9, wherein the pre-allocated portion comprises a persistent buffer, and wherein the memory controller is further to:
   build a persistent, key-values hash table that is stored in the persistent buffer with which to perform a lookup between the first address and the identified second address in view of a hash of the first address; and
   when reading the first address, perform a lookup in the key-values hash table to determine the data to prefetch comprises data related to the identified second address.

11. The processor of claim 10, wherein when the first address also links to a third address according to the set of instructions, and the memory controller is further to:
store a hash of the third address in the persistent memory as also corresponding to the first address; and
when reading the first address, decide whether to prefetch data related to the identified second address or the third address when performing a lookup in the persistent, key-values hash table, depending on a code path within the set of instructions being executed.

12. The processor of claim 10, wherein, to store the information indicating the relationship in the persistent buffer, the memory controller is further to:
request a trace of traversal of a linked list stored in the persistent memory and associated with the set of instructions, wherein the linked list is associated with a plurality of addresses including the first address and the identified second address; and
store locations and pointers of the plurality of addresses of the linked list in the persistent, key-values hash table and associated with respective addresses of the plurality of addresses.

13. The processor of claim 9, wherein to store the information indicating the relationship, the memory controller is to physically link the information to the data corresponding to the identified second address.

14. The processor of claim 9, wherein the set of instructions corresponds to an application that executes an operation comprising one of: pointer chasing, graph traversal or lookups in a hash table.

15. The processor of claim 9, wherein the memory controller is further to identify an application including the set of instructions by a level of repeatability of addresses within the set of instructions.

16. A method comprising:
storing, by a memory controller and in a pre-allocated portion of a bit-addressable, random access persistent memory, information indicating a relationship between a group of addresses being stored in the persistent memory according to a set of instructions, when executed; and
retrieving, by the memory controller, the relationship from the information when accessing an address from the group of addresses.

17. The method of claim 16, wherein the storing comprises:
detecting the relationship between the group of addresses;
requesting a trace of traversal of a linked list stored in the persistent memory; and
storing locations and pointers of the linked list in the pre-allocated portion and associated with a trace identifier for the trace.

18. The method of claim 17, wherein storing the information indicating the relationship in the pre-allocated portion comprises storing the information in a part of a memory array that is linked to data corresponding to the group of addresses.

19. The method of claim 16, wherein storing the information indicating the relationship in the pre-allocated portion comprises storing the information in a persistent memory buffer, and wherein the persistent memory is disposed on a circuit board of a dual in-line memory module (DIMM).

20. The method of claim 16, wherein the storing comprises physically linking the information, indicating the relationship, to data corresponding to the group of addresses, the method further comprising prefetching, by the memory controller, data corresponding to the group of addresses within the relationship to be stored locally, in response to the retrieving.

21. A system comprising:
a motherboard substrate having a first socket and a second socket, wherein a processor is inserted into the first socket and an integrated circuit containing bit-addressable, random access persistent memory is inserted into the second socket;
wherein the processor comprises a memory controller to:
store, in a pre-allocated portion of the persistent memory, information indicating a relationship between a group of addresses being stored in the persistent memory according to a set of instructions, when executed; and
retrieve the relationship from the information when accessing an address from the group of addresses.

22. The system of claim 21, wherein, to store the information indicating the relationship in the pre-allocated portion, the memory controller is further to:
detect the relationship between the group of addresses;
request a trace of traversal of a linked list stored in the persistent memory; and
store locations and pointers of the linked list in the pre-allocated portion and associated with a trace identifier for the trace.

23. The system of claim 21, wherein the pre-allocated portion of the persistent memory comprises a part of a memory array that is linked to data corresponding to the group of addresses.

24. The system of claim 21, wherein the pre-allocated portion of the persistent memory comprises a persistent memory buffer.

25. The system of claim 21, wherein, to store the information indicating the relationship in the pre-allocated portion, the memory controller is to physically link the information to data corresponding to the group of addresses, and wherein the memory controller is further to prefetch the data corresponding to the group of addresses to be stored locally in a cache.

* * * * *